United States Patent
Samuel et al.

(10) Patent No.: US 11,150,901 B2
(45) Date of Patent: Oct. 19, 2021

(54) SYSTEMS AND METHODS FOR MINIMIZING FREQUENCY OF GARBAGE COLLECTION BY DEDUPLICATION OF VARIABLES

(71) Applicant: Dell Products L.P., Round Rock, TX (US)

(72) Inventors: Balasingh P. Samuel, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 16/751,554

(22) Filed: Jan. 24, 2020

(65) Prior Publication Data

US 2021/0232398 A1    Jul. 29, 2021

(51) Int. Cl.
*G06F 12/00* (2006.01)
*G06F 9/30* (2018.01)
*G06F 12/0808* (2016.01)
*G06F 9/4401* (2018.01)
*G06F 3/06* (2006.01)
*G06F 12/02* (2006.01)

(52) U.S. Cl.
CPC ........ *G06F 9/30029* (2013.01); *G06F 3/0614* (2013.01); *G06F 3/0641* (2013.01); *G06F 3/0679* (2013.01); *G06F 9/30047* (2013.01); *G06F 9/4406* (2013.01); *G06F 12/0253* (2013.01); *G06F 12/0808* (2013.01); *G06F 2212/7209* (2013.01)

(58) Field of Classification Search
CPC .... G06F 3/0614; G06F 3/0641; G06F 3/0679; G06F 12/0253; G06F 12/0808; G06F 2212/7209
See application file for complete search history.

(56) References Cited

U.S. PATENT DOCUMENTS

| | | | |
|---|---|---|---|
| 2008/0091901 A1* | 4/2008 | Bennett | G06F 12/0246 711/165 |
| 2016/0179386 A1* | 6/2016 | Zhang | G06F 3/0688 711/103 |
| 2016/0179395 A1* | 6/2016 | Fisher | G06F 3/0688 711/103 |

* cited by examiner

*Primary Examiner* — Gurtej Bansal
(74) *Attorney, Agent, or Firm* — Jackson Walker L.L.P.

(57) ABSTRACT

An information handling system may include a processor and a program of instructions embodied in non-transitory computer-readable media and configured to, when read and executed by the processor: in response to a request to write a variable to a solid state device, store the variable to a memory location of the solid state device, the variable including variable data and a variable status indicative of a validity of the variable data, the variable status having a plurality of bits wherein each of the plurality of bits are set to an initial value and in response to a request to modify the variable, modify the variable status by changing one of the plurality of bits from the initial value to a logical complement of the initial value to change the validity of the variable data. The validity of the variable data may be based on whether an even number or odd number of the plurality of bits are equal to the complement of the initial value.

19 Claims, 3 Drawing Sheets

| BIT COUNT | STATE |
|---|---|
| ALL 1'S | VALID |
| ODD NUMBER OF 0'S | INVALID |
| EVEN NUMBER OF 0'S | VALID |
| ALL 0'S | JUNK |

| BIT COUNT | STATE |
|---|---|
| ALL 1'S | VALID |
| ODD NUMBER OF 0'S | INVALID |
| EVEN NUMBER OF 0'S | VALID |
| ALL 0'S | JUNK |

SYSTEMS AND METHODS FOR MINIMIZING FREQUENCY OF GARBAGE COLLECTION BY DEDUPLICATION OF VARIABLES

TECHNICAL FIELD

The present disclosure relates in general to information handling systems, and more specifically to minimizing the frequency of garbage collection in solid-state storage devices via deduplication of variables.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources (e.g., hard disk drives) to store data and programs of instructions for later retrieval. Increasingly, information handling systems employ solid-state storage devices (e.g., solid-state drives), in lieu of or in addition to traditional magnetic hard disk drives. A solid-state device (SSD) is a data storage device that uses solid-state memory (e.g., flash memory) to store persistent data. An SSD may emulate a hard disk drive interface, thus easily replacing it in most applications.

SSDs often use NAND flash memory as their underlying storage medium. One of the limitations for writing to NAND flash memory is that a page of memory must be empty before it is written to. Thus, if data exists in the page, the page must be erased before data is written to it. An SSD may track data using a mapping table that maintains the location in the SSD for each data segment. Each data segment, which may also be known as a Flash Translation Layer (FTL) block, may be the smallest unit in an SSD. Accordingly, two approaches may typically be used to rewrite data to an SSD. If the new data is smaller than the smallest unit size of the SSD (e.g., an FTL block), the existing data must be read and merged with the new data, with the merged data written to a new location in the SSD. After data is written to the new location, the old location is invalidated. If the new data is larger than the smallest unit size of the SSD, new data is written to a different location of the flash memory and the old location is invalidated.

Over time, the SSD may include many "dirty" blocks that contain invalid data. In order to continue writing to blocks, a controller of the SSD must "clean" these blocks by performing a function known as garbage collection. Garbage collection typically includes the act of determining blocks that include a threshold level of invalid data. Valid data from such blocks are collected, aggregated, and written to new SSD memory locations, and the blocks are erased. Such garbage collection can adversely affect the overall performance of an SSD (particularly writes), as the SSD must handle garbage collection while supporting input/output operations. Accordingly, when such garbage collection occurs, it may negatively impact performance of an information handling system.

For example, an SSD known as non-volatile random-access memory (NVRAM) may be used by a basic input/output system (BIOS) of an information handling system to store system configuration information, Unified Extensible Firmware Interface (UEFI) variables, a system boot flow path, system telemetry data and/or more information.

The UEFI variable services provide an interface for the BIOS to read, write and delete a variable. However, UEFI variable services may add more overhead to NVRAM management. For example, just to update one bit of data, data overhead for such one bit may be 40 bytes or more due to metadata and other information that may require storage in addition to the data itself. Such overhead is an inheritance feature of the variable services, as an access interface may use a 128-bit global user identifier (GUID) and variable name. Further, the garbage collection process for an NVRAM used by BIOS may add significantly more boot time to boot of an information handling system (e.g., in the range of 30+ seconds). Typical garbage collection frequency using traditional approaches may occur once every 30 to 50 boot cycles, depending on frequency of changes to BIOS setup.

Further, such frequent garbage collection may also decrease longevity of the NVRAM, due to SSDs typically having a limited number of write-erase cycles.

SUMMARY

In accordance with the teachings of the present disclosure, the disadvantages and problems associated with degraded performance due to garbage collection have been reduced or eliminated.

In accordance with embodiments of the present disclosure, an information handling system may include a processor and a program of instructions embodied in non-transitory computer-readable media and configured to, when read and executed by the processor: in response to a request to write a variable to a solid state device, store the variable to a memory location of the solid state device, the variable including variable data and a variable status indicative of a validity of the variable data, the variable status having a plurality of bits wherein each of the plurality of bits are set to an initial value and in response to a request to modify the variable, modify the variable status by changing one of the plurality of bits from the initial value to a logical complement of the initial value to change the validity of the variable data. The validity of the variable data may be based on whether an even number or odd number of the plurality of bits are equal to the complement of the initial value.

In accordance with these and other embodiments of the present disclosure, a method may include in response to a request to write a variable to a solid state device, storing the variable to a memory location of the solid state device, the variable including variable data and a variable status indicative of a validity of the variable data, the variable status having a plurality of bits wherein each of the plurality of bits are set to an initial value and, in response to a request to modify the variable, modifying the variable status by changing one of the plurality of bits from the initial value to a logical complement of the initial value to change the validity of the variable data. The validity of the variable data may be based on whether an even number or odd number of the plurality of bits are equal to the complement of the initial value.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system of an information handling system: (i) in response to a request to write a variable to a solid state device, store the variable to a memory location of the solid state device, the variable including variable data and a variable status indicative of a validity of the variable data, the variable status having a plurality of bits wherein each of the plurality of bits are set to an initial value; and, (ii) in response to a request to modify the variable, modify the variable status by changing one of the plurality of bits from the initial value to a logical complement of the initial value to change the validity of the variable data. The validity of the variable data may be based on whether an even number or odd number of the plurality of bits are equal to the complement of the initial value.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

Figure 1:
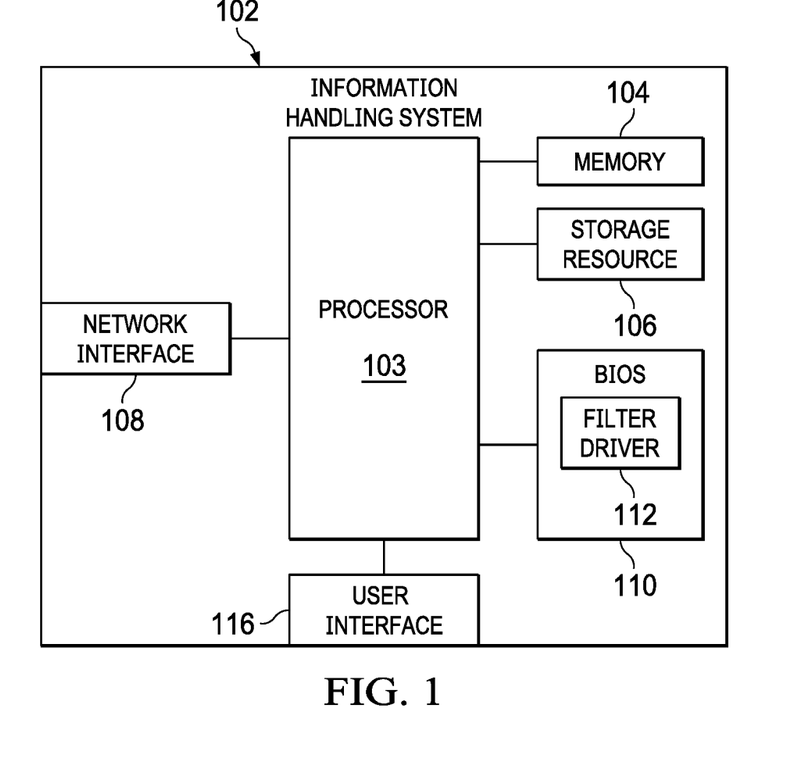
FIG. 1 illustrates a block diagram of an example information handling system adapted for preboot healing of platform issues that cause operating system stop error code crashes, in accordance with certain embodiments of the present disclosure.

FIG. 1 illustrates a block diagram of an example information handling system 102 adapted for preboot healing of platform issues that cause operating system stop error code crashes, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. In these and other embodiments, storage resource 106 may comprise a solid state device (SSD), such as, for example, a non-volatile random access memory (NVRAM). In some of such embodiments, storage resource 106 may be coupled to processor 103 a via Serial Peripheral Interface (SPI) or an enhanced Serial Peripheral Interface (eSPI), and BIOS 105 may communicate with storage resource 106 over such interface, Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may include filter driver 112. Filter driver 112 may comprise a BIOS driver implemented by a program of instructions that, when read and executed by processor 103, may actively manage an SSD (e.g., storage resource 106) to minimize garbage collection frequency and extend longevity of the SSD by proactively avoiding duplication of data in the SSD, as described in greater detail below. In some embodiments, filter driver 112 may execute on top of UEFI variable services.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, as mentioned above, filter driver 112 may actively manage an SSD (e.g., storage resource 106) to minimize garbage collection frequency and extend longevity of the SSD by proactively avoiding duplication of data in the SSD. As background to illustrate the functionality of filter driver 112, an SSD may be implemented using flash memory. Before writing to a block flash memory, each bit of the block is typically erased and initialized to an initial value (e.g., either logic 1 or logic 0, depending on the flash technology used), and a write operation is performed by changing some bits from their initial values to the opposite binary value (e.g., 1 to 0 or 0 to 1, depending on the flash technology used), such that after the write operation, the bits within the block are equivalent to the data to be written. Once a bit value is changed, it typically cannot be changed back to its original value without erasing the entire block of data comprising the bit. This circumstance leads to the need for garbage collection. When an SSD block is logically overwritten, in reality the data is physically written to a new block and the old block of data is marked as invalid. After a threshold of the SSD has been used and marked as invalid, garbage collection is used to erase the invalid blocks for reuse.

In some embodiments, filter driver 112 may be used to manage Boolean-type variables (e.g., two-state variables such as enable/disable, on/off, true/false, etc.). FIGS. 2A-2E illustrate various fields of a Boolean-type variable 200 and a number of states of a variable state field 208, in accordance with embodiments of the present disclosure.

Figure 2A:
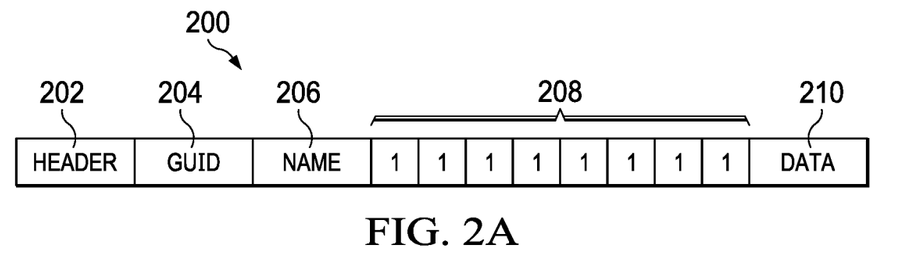
FIGS. 2A-2E illustrates various fields of a Boolean-type variable and a number of states of a variable state field, in accordance with embodiments of the present disclosure.

As shown in FIG. 2A, when filter driver 112 creates a new Boolean-type variable 200, filter driver 112 may store information regarding a variable header 202, global user identifier (GUID) 204, variable name 206, variable state 208, and variable data 210. The use of variable headers and GUIDs are well-known in the art and thus are not discussed in detail herein. Variable name 206 may comprise a uniquely identifying name for variable 200 to be stored and variable data 210 may represent the initial value of the Boolean-type data (e.g., on/off, enabled/disabled, etc.) when created by filter driver 112.

Variable state 208 may comprise a field of metadata that represents for variable 200 whether variable data 210 for such variable data is valid or invalid, as explained in greater detail below. Although variable state 208 is shown in FIGS. 2A-2E as comprising eight bits, it is understood that variable state 208 may be of any suitable length. When filter driver 112 creates a new Boolean-type variable 200, it may initialize each bit of variable state 208 with the same bit value (e.g., 1 or 0, depending on the SSD technology being used). For illustrative purposes in this disclosure, FIG. 2A shows all of the bits of variable state 208 being initialized to a value of logic 1.

Figure 3:
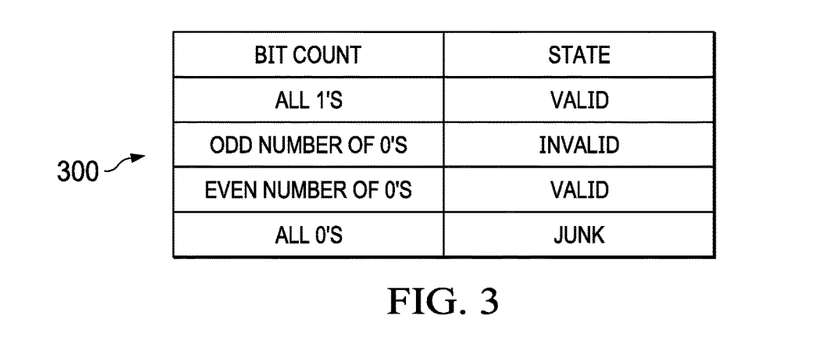
FIG. 3 illustrates a truth table for a variable state field, in accordance with embodiments of the present disclosure.

In operation, a bit count of variable state 208 may define a validity of variable data 210. For example, FIG. 3 illustrates an example truth table 300 for mapping a value stored in variable state 208 to a state of variable data 210. As shown in FIG. 3:
- when all bits of variable state 208 are at their initial value (e.g., all logic 1), the value of variable state 208 may indicate that variable data 210 is valid;
- when variable state 208 includes at least one bit having the initial value (e.g., logic 1) but an odd number of bits having the complement of the initial value (e.g., logic 0), the value of variable state 208 may indicate that variable data 210 is invalid;
- when variable state 208 includes at least one bit having the initial value (e.g., logic 1) but an even number of bits having the complement of the initial value (e.g., logic 0), the value of variable state 208 may indicate that variable data 210 is valid; and
- when variable state 208 includes all bits having the complement of the initial value (e.g., logic 0), the value of variable state 208 may indicate that variable 200 is marked as "junk."

Thus, upon a subsequent read of a variable 200, if the value of variable state 208 indicates that variable data 210 is valid, then variable 200 may be translated by the read operation as having the value as stored in variable data 210. On the other hand, if the value of variable state 208 indicates that variable data 210 is invalid, then variable 200 may be translated by the read operation as having a value which is the Boolean complement to the value stored in variable data 210. In the event variable 200 is marked as junk, such designation may indicate that the variable cannot be further recycled and may be reclaimed after the next erase process for the block including variable 200. Further, when variable 200 is marked as junk, it may not be able to be translated by a read operation to return either the value stored in variable data 210 or the Boolean complement thereof.

Thus, when variable 200 is first written as shown in FIG. 2A, because each bit of variable state 208 includes the initial value (e.g., all logical 1's), the value in variable data 210 is valid and a read operation of variable 200 in the state depicted in FIG. 2A may translate variable 200 to have the value actually stored in variable data 210.

However, each write operation for variable 200 thereafter, filter driver 112 may change one bit of variable state 208 from its initial value to the complement of the initial value (e.g., from logic 1 to logic 0), essentially toggling the validity of variable data 210 back and forth with each write operation, until such time as variable state 208 indicates it has reached junk state.

Figure 2B:
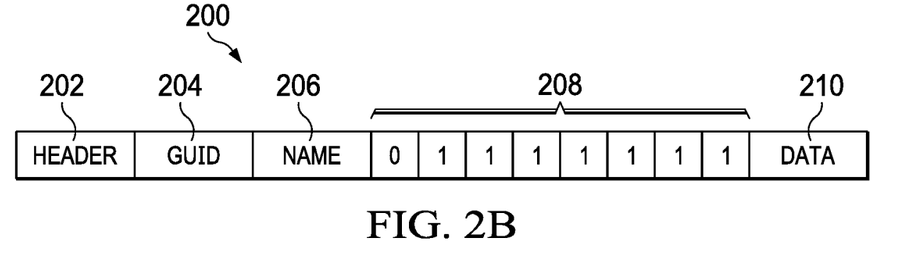

For example, FIG. 2B illustrates an example of the contents of variable 200 after it is written for a second time (e.g., for the first time after the initial write operation represented by FIG. 2A). As shown in FIG. 2B, during such second write operation, filter driver 112 may change a bit (e.g., the first bit) of variable state 208 from its initial value (e.g., logic 1) to the complement of the initial value (e.g., logic 0). Accordingly, if variable 200 is read in the state shown in FIG. 2B, because variable state 208 includes an odd number of bits with the complement of the initial value, variable data 210 is "invalid" meaning the read operation may translate the value of variable 200 to be the logical complement of the value stored as variable data 210.

Figure 2C:
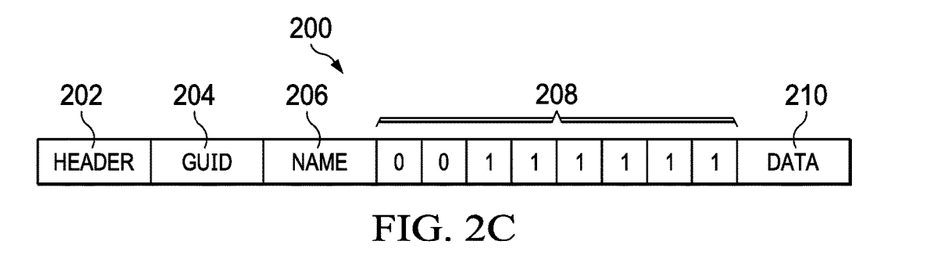

As another example, FIG. 2C illustrates an example of the contents of variable 200 after it is written for a third time (e.g., for the second time after the initial write operation represented by FIG. 2A). As shown in FIG. 2C, during such third write operation, filter driver 112 may change a bit (e.g., the second bit) of variable state 208 from its initial value (e.g., logic 1) to the complement of the initial value (e.g., logic 0). Accordingly, if variable 200 is read in the state shown in FIG. 2C, because variable state 208 includes an even number of bits with the complement of the initial value, variable data 210 is "valid" meaning the read operation may translate the value of variable 200 to be the value stored as variable data 210.

Figure 2D:
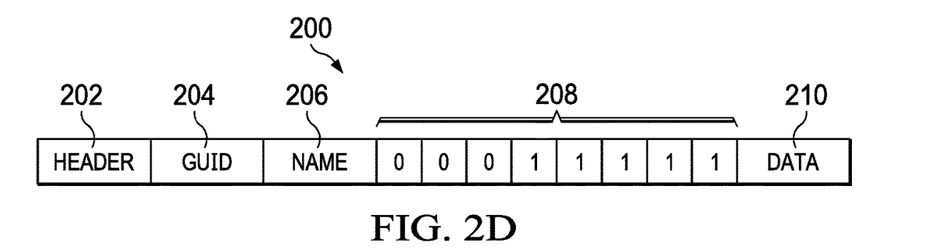

As a further example, FIG. 2D illustrates an example of the contents of variable 200 after it is written for a fourth time (e.g., for the third time after the initial write operation represented by FIG. 2A). As shown in FIG. 2D, during such fourth write operation, filter driver 112 may change a bit (e.g., the third bit) of variable state 208 from its initial value (e.g., logic 1) to the complement of the initial value (e.g., logic 0). Accordingly, if variable 200 is read in the state shown in FIG. 2D, because variable state 208 includes an odd number of bits with the complement of the initial value, variable data 210 is "invalid" meaning the read operation may translate the value of variable 200 to be the logical complement of the value stored as variable data 210.

Figure 2E:
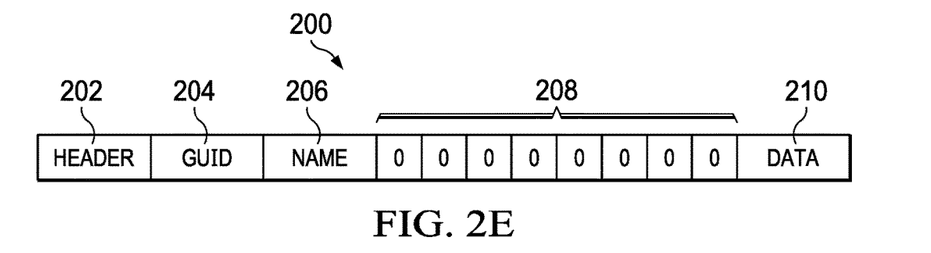

As an additional example, FIG. 2E illustrates an example of the contents of variable 200 when it is written a number of times such that filter driver 112 changes the final bit of variable state 208 from its initial value (e.g., logic 1) to the complement of the initial value (e.g., logic 0), such that all bits of variable state 208 are the complement of their initial values, indicating that variable 200 is in a junk state, to be reclaimed the next time the block comprising variable 200 is erased. In connection with such write operation, filter driver 112 may recreate variable 200 in another portion of an SSD in the form shown in FIG. 2A.

Although the foregoing contemplates that filter driver 112 may modify variable 200 to the state shown in FIG. 2E after a number of write operations for variable 200, in some instances, filter driver 112 may modify variable 200 such that all bits of variable state 208 are set to the complement of their initial values upon a deletion of variable 200.

In the same or alternative embodiments to those disclosed above, filter driver 112 may extend the principles described above for managing Boolean-type variables to variables that may have more than two possible values. FIGS. 4A-4D illustrate various fields of a variable 400 and a number of states of variable state fields 408 of variable 400, in accordance with embodiments of the present disclosure.

Figure 4A:
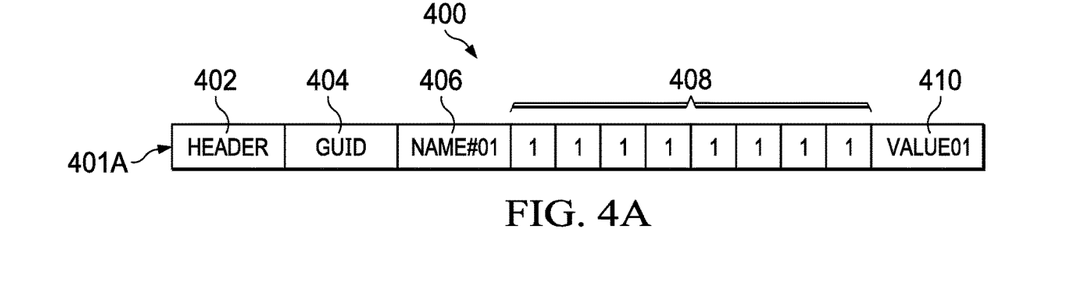
FIGS. 4A-4D illustrates various fields of a variable and a number of states of variable state fields of the variable, in accordance with embodiments of the present disclosure.

As shown in FIG. 4A, when filter driver 112 creates a new variable 400, filter driver 112 may store a sub-variable 401A with information regarding a variable header 402, global user identifier (GUID) 404, variable name 406, variable state 408, and variable data 410. The use of variable headers and GUIDs are well-known in the art and thus are not discussed in detail herein. Variable name 406 may comprise a uniquely identifying name for variable 400 to be stored, with a suffix (e.g., "#01," "#02," "#03," etc.) for each different value of variable data 410 stored for variable 400. Variable data 410 may represent data written in connection with a sub-variable 401.

Variable state 408 may comprise a field of metadata that represents for sub-variable 401 whether variable data 410 for such a sub-variable 401 is valid or invalid, as explained in greater detail below. Although variable state 408 is shown in FIGS. 4A-4D as comprising eight bits, it is understood that variable state 408 may be of any suitable length. When filter driver 112 creates a new variable 400, it may create a new sub-variable 401A and initialize each bit of variable state 408 of sub-variable 401A with the same bit value (e.g., 1 or 0, depending on the SSD technology being used). For illustrative purposes in this disclosure, FIG. 4A shows all of the bits of variable state 408 being initialized to a value of logic 1.

In operation, a bit count of variable state 408 may define a validity of variable data 410 stored within a particular sub-variable 401. For example, as for the case of Boolean-type variables, FIG. 3 illustrates an example truth table 300 for mapping a value stored in variable state 408 to a state of variable data 410. Accordingly, for non-Boolean variables:
  when all bits of variable state 408 are at their initial value (e.g., all logic 1), the value of variable state 408 may indicate that variable data 401 is valid;
  when variable state 408 includes at least one bit having the initial value (e.g., logic 1) but an odd number of bits having the complement of the initial value (e.g., logic 0), the value of variable state 408 may indicate that variable data 410 is invalid;
  when variable state 408 includes at least one bit having the initial value (e.g., logic 1) but an even number of bits having the complement of the initial value (e.g., logic 0), the value of variable state 408 may indicate that variable data 410 is valid; and
  when variable state 408 includes all bits having the complement of the initial value (e.g., logic 0), the value of variable state 408 may indicate that sub-variable 401 is marked as "junk."

Thus, upon a subsequent read of a variable 400, if the value of variable state 408 indicates that variable data 410 of a sub-variable 401 is valid, then variable 400 may be translated by the read operation as having the valid value as stored in such variable data 410 of such sub-variable 401. On the other hand, if the value of variable state 408 indicates that variable data 410 of a sub-variable 401 is invalid, then variable 400 may be not be translated as having a value as stored in such variable data 410 of such sub-variable 401 (and may instead be translated as having the value stored in variable data 410 of another sub-variable 401 for which variable data 410 is indicated by its variable state 408 to be valid). In the event a sub-variable 401 is marked as junk, such designation may indicate that the variable cannot be further recycled and may be reclaimed after the next erase process for the block including sub-variable 401 (in which case, filter driver 112 may re-create the sub-variable 401 at another memory location of the SSD). Further, when a sub-variable 401 is marked as junk, it may not be able to be translated by a read operation to return the value stored in variable data 410 of such sub-variable 401.

Thus, when variable 400 is first written as shown in FIG. 4A, because each bit of variable state 408 of sub-variable 401A includes the initial value (e.g., all logical 1's), the value in variable data 410 of sub-variable 401A is valid and a read operation of variable 400 in the state depicted in FIG. 4A may translate variable 400 to have the value stored in variable data 410 of sub-variable 401A.

However, each write operation for variable 400 thereafter, filter driver 112 may change one bit of a then-valid sub-variable 401 from its initial value to the complement of the initial value (e.g., from logic 1 to logic 0), essentially changing the state of such sub-variable 401 to invalid. In addition, filter driver 112 may, for such a write transaction, either: (a) if a new, previously-unused value for variable 400, create a new sub-variable 401 for such variable 400 and initialize it to the state represented by FIG. 4A, or (b) if a previously-used value for variable 400 is already stored in variable data 410 of an invalid sub-variable 401, change one bit of such invalid sub-variable 401 from its initial value to the complement of the initial value (e.g., from logic 1 to logic 0), essentially changing the state of such sub-variable 401 back to valid.

Figure 4B:
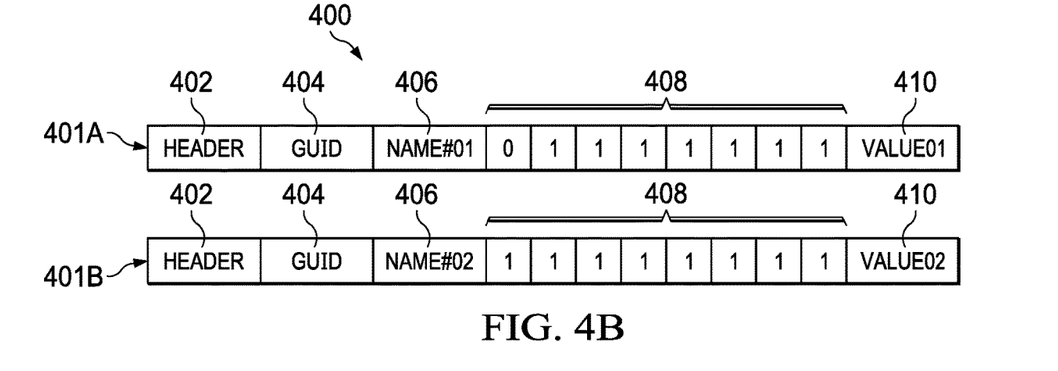

For example, FIG. 4B illustrates an example of the contents of variable 400 after it is written for a second time (e.g., for the first time after the initial write operation represented by FIG. 4A). As shown in FIG. 4B, during such second write operation, filter driver 112 may change a bit (e.g., the first bit) of variable state 408 of sub-variable 401A from its initial value (e.g., logic 1) to the complement of the initial value (e.g., logic 0), thus changing its state to invalid. Furthermore, filter driver 112 may create a new sub-variable 401B for variable 400 with a similar variable name 406 (e.g., differing only in suffix from that of sub-variable 401A), with the new value for variable 400 stored in variable data 410 of sub-variable 401B and all bits of variable state 408 of new sub-variable 401B initialized to initial values (e.g., logic 1), thus setting its state to valid. Accordingly, if variable 400 is read in the state shown in FIG. 4B, the read operation may translate the value of variable 400 to be the value set forth in variable data 410 of valid sub-variable 401B and not that of invalid sub-variable 401A.

Figure 4C:
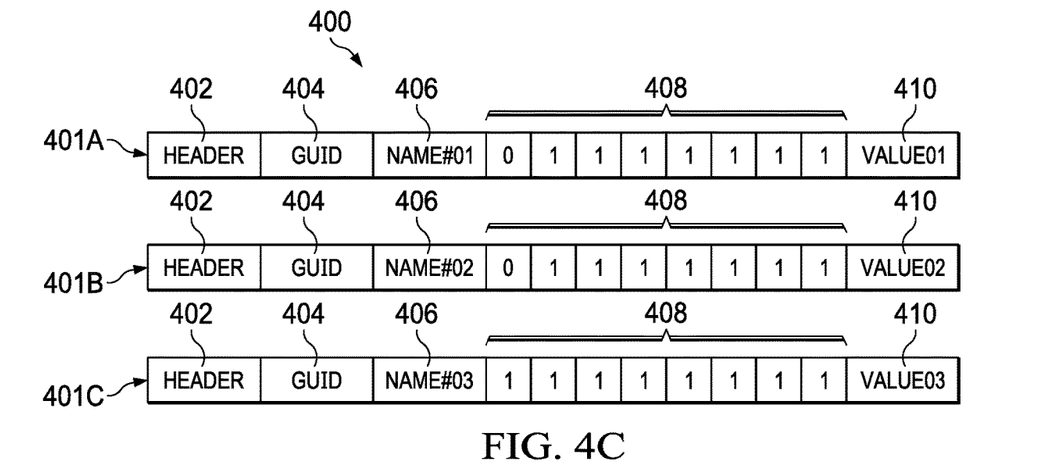

As another example, FIG. 4C illustrates an example of the contents of variable 400 after it is written for a third time (e.g., for the second time after the initial write operation represented by FIG. 4A), with a third data value different than that set forth in variable data 410 of sub-variables 401A and 401B. As shown in FIG. 4C, during such third write operation, filter driver 112 may change a bit (e.g., the first bit) of variable state 408 of sub-variable 401B from its initial value (e.g., logic 1) to the complement of the initial value (e.g., logic 0), thus changing its state to invalid. Furthermore, filter driver 112 may create a new sub-variable 401C for variable 400 with a similar variable name 406 (e.g., differing only in suffix from that of sub-variables 401A and 401B), with the new value for variable 400 stored in variable data 410 of sub-variable 401C and all bits of variable state 408 of new sub-variable 401C initialized to initial values (e.g., logic 1), thus setting its state to valid. Accordingly, if variable 400 is read in the state shown in FIG. 4C, the read operation may translate the value of variable 400 to be the value set forth in variable data 410 of valid sub-variable 401C and not that of invalid sub-variable 401A or invalid sub-variable 401B.

Figure 4D:
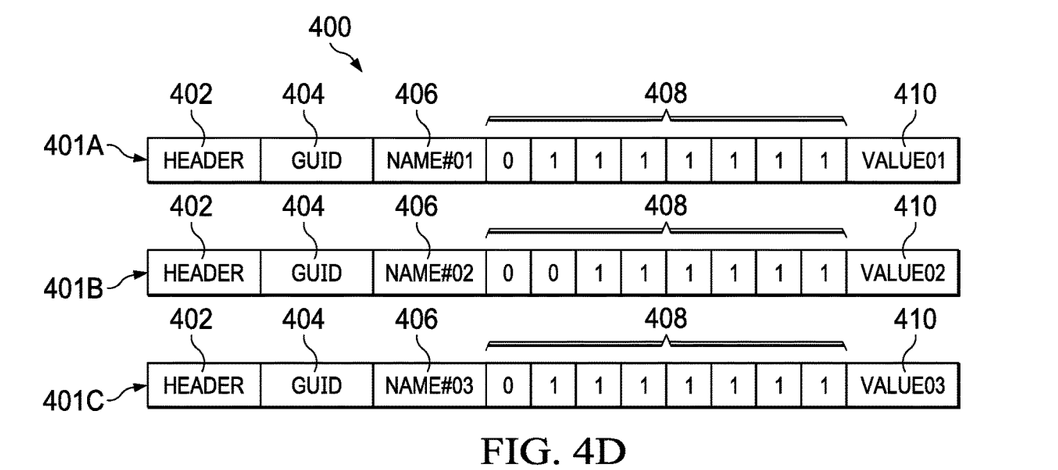

As a further example, FIG. 4D illustrates an example of the contents of variable 400 after it is written for a fourth time (e.g., for the third time after the initial write operation represented by FIG. 4A), with the data value set forth in variable data 410 of invalid sub-variable 401B. As shown in FIG. 4D, during such third write operation, filter driver 112 may change a bit (e.g., the first bit) of variable state 408 of sub-variable 401C from its initial value (e.g., logic 1) to the complement of the initial value (e.g., logic 0), thus changing its state to invalid. Furthermore, filter driver 112 may change a bit (e.g., the second bit) of variable state 408 of sub-variable 401B from its initial value (e.g., logic 1) to the complement of the initial value (e.g., logic 0), thus changing its state back to valid and allowing the value stored in sub-variable 401B to be reused without requiring the use of a new storage location within the SSD. Accordingly, if variable 400 is read in the state shown in FIG. 4D, the read operation may translate the value of variable 400 to be the value set forth in variable data 410 of valid sub-variable 401B and not that of invalid sub-variable 401A or invalid sub-variable 401C.

Over time, a variable state 408 of a sub-variable 401 may be changed enough that it reaches the junk state, similar to that shown in FIG. 2E. At such point, filter driver 112 may recreate such sub-variable with an initial state (e.g., initializing variable state 408 similar to that shown in FIG. 4A) in another location of the SSD.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a program of instructions embodied in non-transitory computer-readable media and configured to, when read and executed by the processor:
      in response to a request to write a variable to a solid state device, store the variable to a memory location of the solid state device, the variable including variable data and a variable status indicative of a validity of the variable data, the variable status having a plurality of bits wherein each of the plurality of bits are set to an initial value; and
      in response to a request to modify the variable, modify the variable status by changing one of the plurality of bits from the initial value to a logical complement of the initial value to change the validity of the variable data;
      wherein the validity of the variable data is based on whether an even number or odd number of the plurality of bits are equal to the complement of the initial value.

2. The information handling system of claim 1, wherein:
   the variable is a Boolean-type variable;
   validity of the variable data, as determined based on the variable status, indicates the variable is equal to the value set forth in the variable data; and
   invalidity of the variable data, as determined based on the variable status, indicates the variable is equal to a logical complement of the value set forth in the variable data.

3. The information handling system of claim 1, the program of instructions further configured to, responsive to all of the plurality of bits of the variable data being changed to the complement of the initial value:
   mark the variable as junk; and
   store the variable at a second memory location of the solid state device with each of the plurality of bits of the variable status set to an initial value.

4. The information handling system of claim 1, wherein:
   the variable has more than two possible values for the variable data and the variable is represented by one or more sub-variables, each of the one or more sub-variables including a respective variable data and a respective variable status indicative of a respective validity of the respective variable data, the respective variable status having a plurality of bits wherein each of the plurality of bits are set to an initial value;

validity of respective variable data of a particular sub-variable, as determined based on the respective variable status of the particular sub-variable, indicates the variable is equal to the value set forth in the respective variable data; and invalidity of respective variable data of the particular sub-variable, as determined based on the respective variable status of the particular sub-variable, indicates the variable is equal to the value set forth in respective variable data of another sub-variable of the variable having a respective variable status of valid.

5. The information handling system of claim 4, the program of instructions further configured to, responsive to all of the plurality of bits of the respective variable data of a sub-variable being changed to the complement of the initial value:

mark the sub-variable as junk; and store the sub-variable at another memory location of the solid state device with each of the plurality of bits of the respective variable status set to an initial value.

6. The information handling system of claim 1, wherein the program of instructions is embodied in a basic input/output system of the information handling system.

7. The information handling system of claim 6, wherein the variable is a variable associated with the basic input/output system.

8. A method comprising:

in response to a request to write a variable to a solid state device, storing the variable to a memory location of the solid state device, the variable including variable data and a variable status indicative of a validity of the variable data, the variable status having a plurality of bits wherein each of the plurality of bits are set to an initial value; and in response to a request to modify the variable, modifying the variable status by changing one of the plurality of bits from the initial value to a logical complement of the initial value to change the validity of the variable data;

wherein the validity of the variable data is based on whether an even number or odd number of the plurality of bits are equal to the complement of the initial value.

9. The method of claim 8, wherein:

the variable is a Boolean-type variable;

validity of the variable data, as determined based on the variable status, indicates the variable is equal to the value set forth in the variable data; and invalidity of the variable data, as determined based on the variable status, indicates the variable is equal to a logical complement of the value set forth in the variable data.

10. The method of claim 8, further comprising, responsive to all of the plurality of bits of the variable data being changed to the complement of the initial value:

marking the variable as junk; and storing the variable at a second memory location of the solid state device with each of the plurality of bits of the variable status set to an initial value.

11. The method of claim 8, wherein the variable is a variable associated with a basic input/output system of an information handling system.

12. The method of claim 8, wherein:

the variable has more than two possible values for the variable data and the variable is represented by one or more sub-variables, each of the one or more sub-variables including a respective variable data and a respective variable status indicative of a respective validity of the respective variable data, the respective variable status having a plurality of bits wherein each of the plurality of bits are set to an initial value;

validity of respective variable data of a particular sub-variable, as determined based on the respective variable status of the particular sub-variable, indicates the variable is equal to the value set forth in the respective variable data; and invalidity of respective variable data of the particular sub-variable, as determined based on the respective variable status of the particular sub-variable, indicates the variable is equal to the value set forth in respective variable data of another sub-variable of the variable having a respective variable status of valid.

13. The method of claim 12, further comprising, responsive to all of the plurality of bits of the respective variable data of a sub-variable being changed to the complement of the initial value:

marking the sub-variable as junk; and storing the sub-variable at a another memory location of the solid state device with each of the plurality of bits of the respective variable status set to an initial value.

14. An article of manufacture comprising:

a non-transitory computer readable medium; and computer-executable instructions carried on the non-transitory computer readable medium, the instructions readable by a processor, the instructions, when read and executed, for causing the processor to, in a basic input/output system of an information handling system:

in response to a request to write a variable to a solid state device, store the variable to a memory location of the solid state device, the variable including variable data and a variable status indicative of a validity of the variable data, the variable status having a plurality of bits wherein each of the plurality of bits are set to an initial value; and in response to a request to modify the variable, modify the variable status by changing one of the plurality of bits from the initial value to a logical complement of the initial value to change the validity of the variable data;

wherein the validity of the variable data is based on whether an even number or odd number of the plurality of bits are equal to the complement of the initial value.

15. The article of claim 14, wherein:

the variable is a Boolean-type variable;

validity of the variable data, as determined based on the variable status, indicates the variable is equal to the value set forth in the variable data; and invalidity of the variable data, as determined based on the variable status, indicates the variable is equal to a logical complement of the value set forth in the variable data.

16. The article of claim 14, the instructions for further causing the processor to, responsive to all of the plurality of bits of the variable data being changed to the complement of the initial value:

mark the variable as junk; and store the variable at a second memory location of the solid state device with each of the plurality of bits of the variable status set to an initial value.

17. The article of claim 14, wherein the variable is a variable associated with a basic input/output system of an information handling system.

18. The article of claim 14, wherein:
- the variable has more than two possible values for the variable data and the variable is represented by one or more sub-variables, each of the one or more sub-variables including a respective variable data and a respective variable status indicative of a respective validity of the respective variable data, the respective variable status having a plurality of bits wherein each of the plurality of bits are set to an initial value;
- validity of respective variable data of a particular sub-variable, as determined based on the respective variable status of the particular sub-variable, indicates the variable is equal to the value set forth in the respective variable data; and
- invalidity of respective variable data of the particular sub-variable, as determined based on the respective variable status of the particular sub-variable, indicates the variable is equal to the value set forth in respective variable data of another sub-variable of the variable having a respective variable status of valid.

19. The article of claim 18, the instructions for further causing the processor to, responsive to all of the plurality of bits of the respective variable data of a sub-variable being changed to the complement of the initial value:
- mark the sub-variable as junk; and
- store the sub-variable at a another memory location of the solid state device with each of the plurality of bits of the respective variable status set to an initial value.

* * * * *